May 21, 1968 J. G. MORROW 3,383,951
MULTIPLE VARIABLE TORQUE CONVERTER APPARATUS
Filed June 8, 1965 3 Sheets-Sheet 1
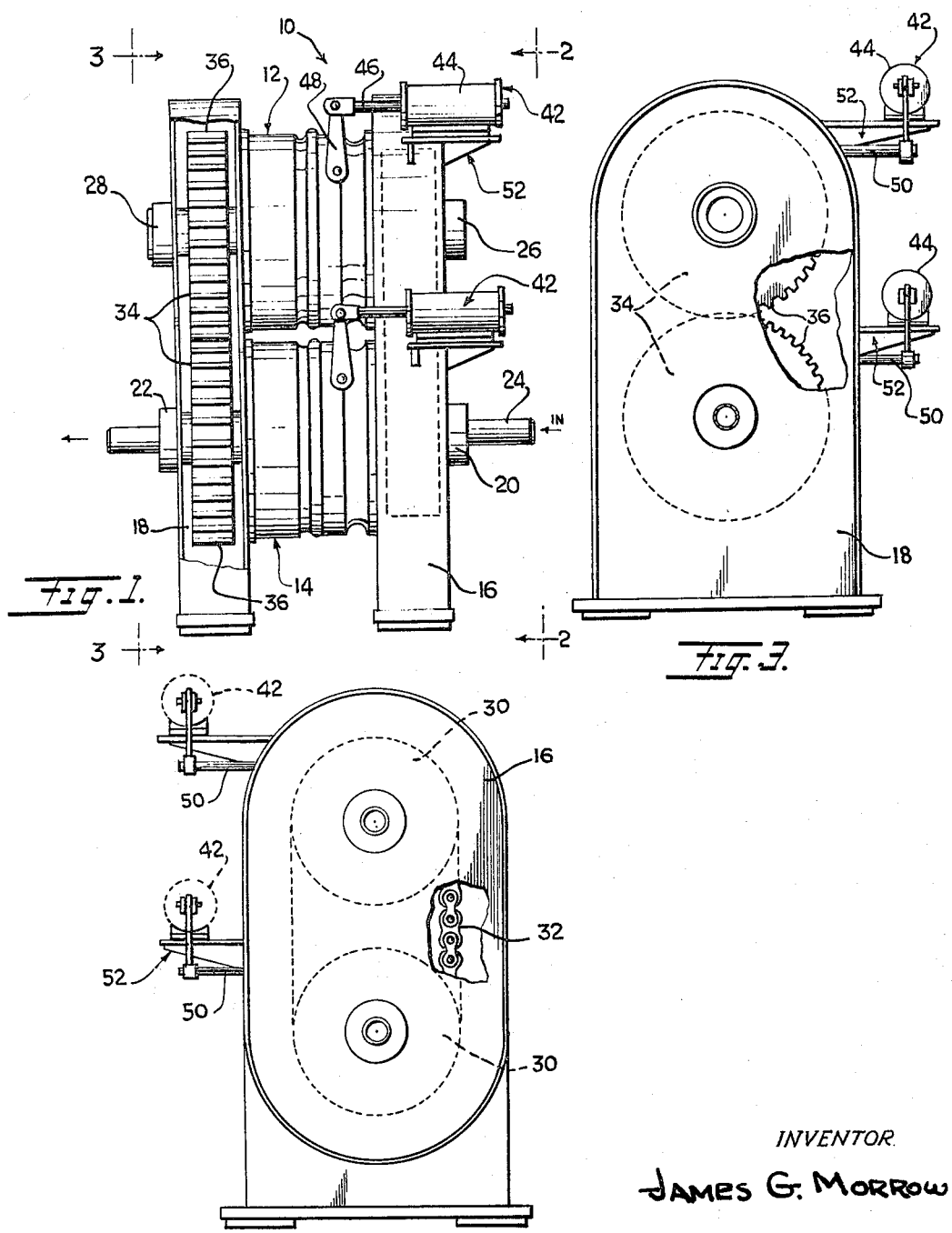
INVENTOR.
JAMES G. MORROW
BY
Robert N. Roley
ATTORNEY

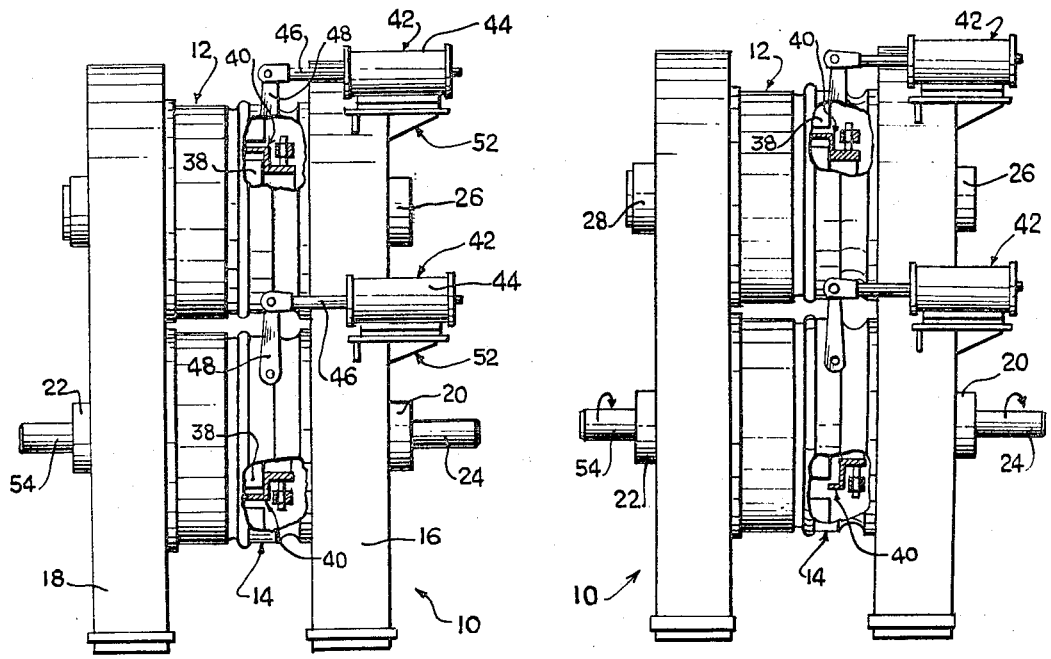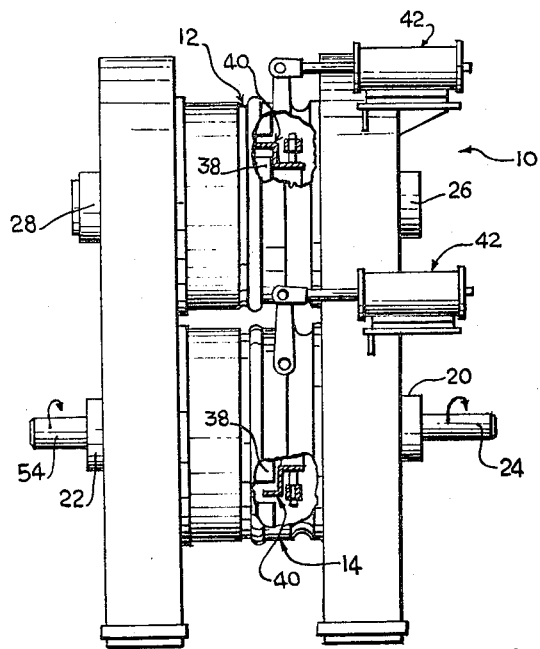

May 21, 1968
J. G. MORROW
3,383,951
MULTIPLE VARIABLE TORQUE CONVERTER APPARATUS
Filed June 8, 1965
3 Sheets-Sheet 3
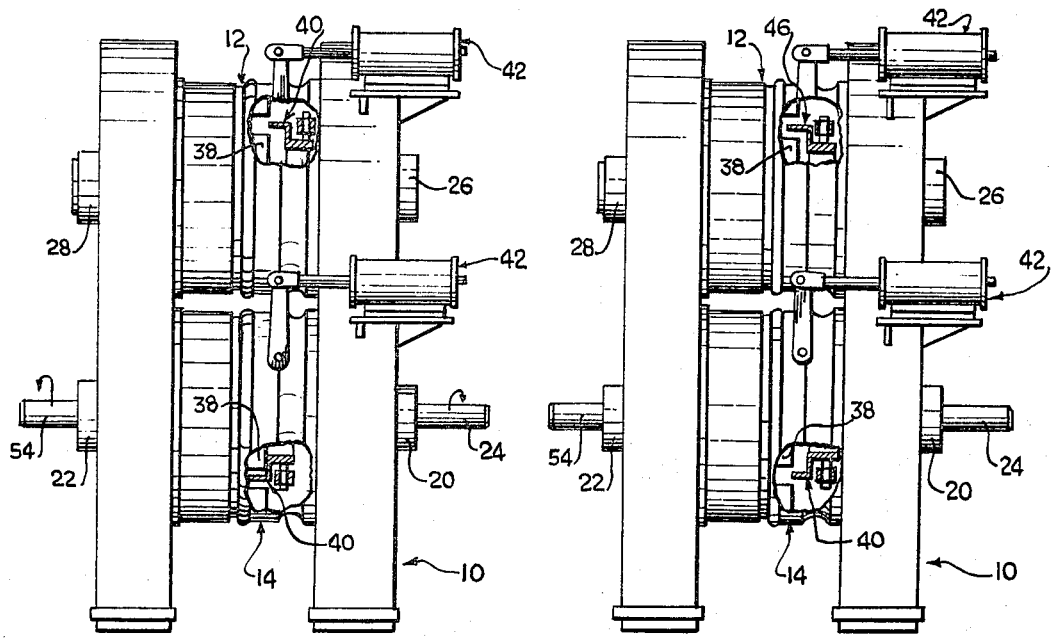
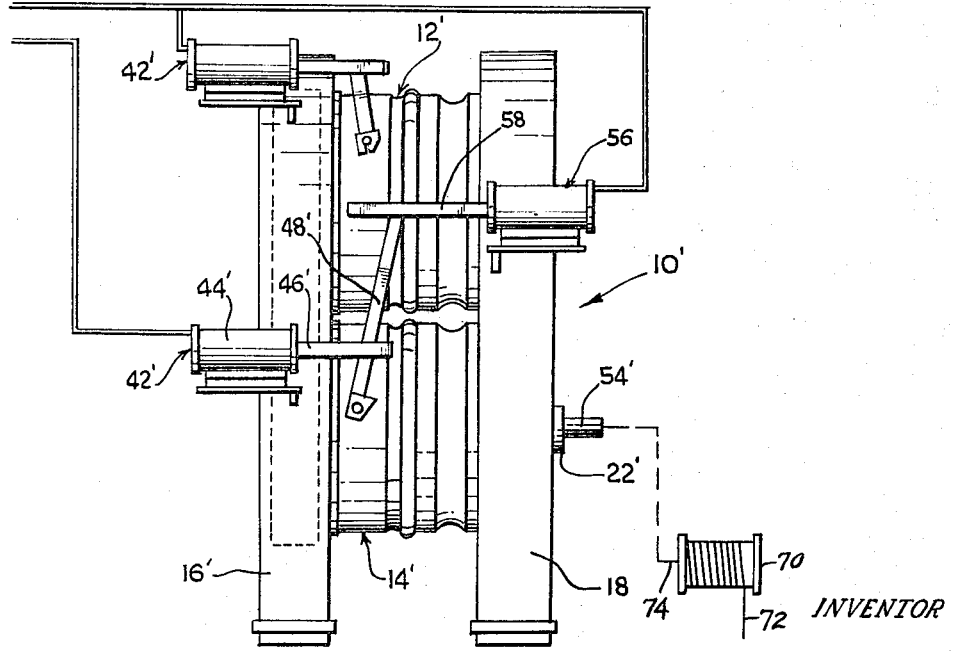
INVENTOR
JAMES G. MORROW
BY
ATTORNEY

United States Patent Office 3,383,951
Patented May 21, 1968

3,383,951
MULTIPLE VARIABLE TORQUE CONVERTER
APPARATUS
James G. Morrow, Manitowoc, Wis., assignor to The
Manitowoc Company Inc., Manitowoc, Wis., a
corporation of Wisconsin
Filed June 8, 1965, Ser. No. 462,353
3 Claims. (Cl. 74—718)

ABSTRACT OF THE DISCLOSURE

This invention relates to a torque converter arrangement which utilizes a pair of side-by-side continuously variable torque converters arranged to drive an output shaft in either a forward direction or a reverse direction. The torque converters are preferably of the type that may be manipulated to vary the output torque with respect to the input torque. The input structures of the two torque converters are operatively connected as by a chain or the like, to drive in the same direction. The output structures of the two torque converters are operatively connected as by meshing gears or the like, to drive in opposite directions. By placing the first torque converter in an operative condition and the second torque converter in an inoperative condition, a forward drive through the arrangement is achieved. By reversing this procedure and placing the second torque converter in an operative condition and the first torque converter in an inoperative condition, a reverse drive is achieved. According to another embodiment of the invention, an interlocking control arrangement is provided for the two torque converters to provide a smooth transition from a forward drive to a reverse drive.

---

The present invention pertains, generally, to a multiple variable torque converter apparatus or engine that is particularly adapted to present a variable output from a constant power input.

More particularly, this invention relates to a multiple variable torque converter apparatus or engine comprising a plurality of variable torque converters disposed in a unitary, superimposed or tandem operative association with one another, said converters being so constructed and arranged as to enable said engine to present a substantially infinite stepless output between the limits of zero power and maximum rated capacity in at least a plurality of driving directions, such as direct or forward drive, and reverse drive.

Torque converters presenting variable power outputs from a constant power input are well known, and are the subject of many useful applications. One such application is, of course, to a vehicle wherein the converter is operatively associated with or between the engine and the drive shaft thereof. This application of a variable torque converter, and many others as well, requires a great deal of versatility. For example, a forward and rerverse drive is required, and, in each driving direction, various power outputs or driving ratios is a criteria.

Other applications require that the converters perform additional functions as well. For example, crane assemblies that are presently available are capable of handling loads of substantial magnitude. This is usually accomplished through the medium of a hoist drum assembly positioned within the upper works or car body of such an assembly. It is desirable that the crane assembly be capable of power raising or power lowering a load of any magnitude. Accordingly, it is necessary that a smooth and positive control be available at the hoist drum in directions of both ascendency and descendency of the load. Moreover, it is extremely desirable that the load be precluded from "running away from the engine," particularly when it is first rendered operative or turned "on."

Having in mind each and every one of the foregoing critera or desideratum and others that will be readily apparent to those skilled in the art, it is a primary object of the present invention to provide a multiple variable torque converter apparatus or engine comprising a plurality of variable torque converters disposed in a unitary, superimposed or tandem operative association with one another, said converters being so constructed and arranged as to enable said engine to present a substantially infinite stepless output between the limits of zero power and maximum rated capacity, in at least a plurality of driving directions, such as direct or forward drive, and reverse drive.

Another primary object of this invention is to provide a multiple variable torque converter apparatus or engine, comprising a plurality of variable torque converters disposed in a unitary, superimposed or tandem operative association with one another, said converters being so constructed and arranged as to enable said engine to present a substantially infinite stepless output between the limits of zero power and maximum rated capacity in at least a plurality of driving directions, such as direct or forward drive, and reverse drive, said converters each of them comprising positioning arrangements operatively associated therewith for smoothly positively and gradually varying the output thereof.

Yet another primary object of the present invention is to provide a multiple variable torque converter apparatus or engine comprising a plurality of variable torque converters, disposed in a unitary, superimposed or tandem operative association with one another, said torque converters each of them comprising an input shaft and an output shaft, and being so constructed and arranged as to enable said input shafts to be rotatably translated in the same direction, and said output shafts to be rotatably translated in oppositely disposed directions, and positioning arrangements operatively associated therewith for smoothly, positively and gradually varying the transmission or torque between said input and output shafts, and for varying the output thereof, enabling said engine to present a substantially infinite stepless output between the limits of zero power and maximum rated capacity in at least a plurality of driving directions, such as direct or forward drive, and reverse drive.

It is an additional primary object of the present invention to provide a multiple variable torque converter apparatus or engine comprising a plurality of variable torque converters, said converters being disposed in a tandem opeartive association with one another and comprising an input shaft and an output shaft, the input shafts of said converters being particularly adapted to be rotatably translated in the same direction, and the output shafts thereof being particularly adapted to be rotatably translated in oppositely disposed directions with respect to one another, said converters each of them further comprising a control member particularly adapted to be axially movable therewithin with respect to a channel through which a fluid is particularly adapted to be circulated, enabling the transmission of torque through each of said converters from the input shaft to the output shaft thereof to be substantially infinitely varied and a positioning arrangement operatively associated with the control member of each of said converters for smoothly, positively and gradually axially movably translating said control members relative to said channels, enabling said engine to present a substantially infinite stepless variable output between the limits of zero power and maximum rated capacity in at least a plurality of driving directions, such as direct or forward drive, and reverse drive, from a constant power input.

Another additional primary object of this invention is to provide a multiple variable torque converter apparatus or engine comprising a plurality of variable torque converters, said converters being disposed in a tandem operative association with one another, and comprising an input shaft and an output shaft, the input shafts of said converters being particularly adapted to be rotatably translated in the same direction, and the output shafts thereof being particularly adapted to be rotatably translated in oppositely disposed directions with respect to one another, said converters each of them further comprising a control member particularly adapted to be axially movable therewithin with respect to a channel through which a fluid is particularly adapted to be circulated, enabling the transmission of torque through each of said converters from the input to the output shaft thereof, to be varied, and a positioning arrangement operatively associated with the control member of each of said converters for smoothly, positively and gradually axially movably translating said control members relative to said channel, enabling said engine to present a substantially infinite stepless output between the limits of zero power and maximum rated capacity in at least a plurality of driving directions, such as direct or forward drive, and reverse drive, from a constant power output, and further enabling one of said converters to present a resisting or retarding force to another of said converters when said other converter is driving the engine in one of said directions, and the other converter to present a resisting or retarding force to said one converter when the latter is driving the engine in another of said directions, still further enabling said engine to exercise a positive control over the output thereof at any value.

A further primary object of the present invention is to provide a multiple variable torque converter apparatus or engine comprising a plurality of variable torque converters, said converters being disposed in a tandem operative association with one another, and comprising an input shaft and an output shaft, the input shafts of said converters being particularly adapted to be rotatably translated in the same direction, and output shafts thereof being particularly adapted to be rotatably translated in oppositely disposed directions with respect to one another, said converters each of them further comprising a control member particularly adapted to be axially movable therewithin with respect to a channel through which a fluid is particularly adapted to be circulated, enabling the transmission of torque through each of said converters from the input to the output shaft thereof to be varied, and a positioning arrangement operatively associated with the control member of each of said converters for smoothly, positively and gradually axially movably translating said control members relative to said channel, enabling said engine to present a substantially infinite stepless output between the limits of zero power and maximum rated capacity in at least a plurality of driving directions, such as direct or forward drive, and reverse drive from a constant power input, and further enabling one of said converters to present a resisting or retarding force to another of said converters when said other converter is driving the engine in one of said directions, and the other converter to present a resisting or retarding force to said one converter when the latter is driving the engine in another of said directions, still further enabling said engine to exercise a positive control over the output thereof at any value, one of said converters further comprising a positioning arrangement for dissipating a force introduced thereby substantially immediately upon rendering the engine operative or "turning it on," the rate of dissipation of the force being particularly adapted to correspond generally with the rate of increase in engine speed to the desired value in that drive direction as defined by another of said converters, enabling the preclusion of a load running away from the engine.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawings:

FIGURE 1 is an elevational view, partially broken away, of a multiple variable torque converter apparatus or engine constructed in accordance with the principles of the present invention;

FIGURE 2 is an end elevational view, partially broken away, taken along the line 2—2 of FIGURE 1;

FIGURE 3 is an end elevational view, partially broken away, taken along the line 3—3 of FIGURE 1;

FIGURE 4 is an elevational view, partially broken away, of th eengine illustrated in FIGURES 1 to 3, showing the component parts thereof in a position to provide a particular output value;

FIGURE 5 is a view similar to FIGURE 4, but showing the component parts in a position to provide another output value;

FIGURE 6 is a view similar to FIGURES 4 and 5, but allustrating the component parts in still another position to provide yet another output value;

FIGURE 7 is a view similar to FIGURES 4 through 6, but showing the component parts in a position to provide a still further output value;

FIGURE 8 is a view similar to FIGURES 4 through 7, showing the component parts in a position to provide a still further output value; and FIGURE 9 is an elevational view of a modification of the engine illustrated in FIGURES 1 through 8, and constructed in accordance with the principles of the present invention.

With reference now to the drawings, and particularly FIGURES 1 to 3, there is illustrated therein a multiple torque converter apparatus 10, constructed in accordance with the principles of the present invention.

The apparatus 10 comprises a plurality of torque converters 12 and 14, each of which is particularly adapted to be substantially identical in construction, configuration and arrangement as the other. The torque converters may be of any suitable and conventional construction, preferably being of the type that is so constructed and arranged as to present a variable output from a constant power source. A variable torque converter of this type is described, disclosed, shown and illustrated in United States Patent 3,221,896.

The variable torque converters 12 and 14 are particularly adapted to be disposed in an operative relationship with respect to one another. More particularly, the converters are particularly adapted to be positioned in a superimposed operative relationship, and, to this end, the apparatus 10 comprises a plurality of casings or housings 16 and 18. The converters may be securely mounted between the casings 16 and 18, in any suitable manner, with the converter 12 being disposed in a superimposed or overlying relationship with respect to the converter 14.

The converter 14 comprises an input shaft 20, that is particularly adapted to extend through the casing 16, and outwardly thereof, and an output shaft 22, that is particularly adapted to extend through the casing 18, and outwardly thereof. The input shaft 20 of the converter 14 is particularly adapted to be operatively associated with a power input shaft 24, this latter shaft in turn being particularly adapted to be operatively associated with a constant power source, such as a motor (not shown). Accordingly, a constant power input will be transmitted to the apparatus 10, through the medium of the converter 14, though it will be understood that the power input could be transmitted through the converter 12. The motor (not shown) can be of any suitable and conventional construction, and, for example, can be a motor of the reversible type. The converter 12, similarly with respect to the converter 14, comprises a input shaft 26, particularly adapted to extend through the casing 16 and outwardly thereof, and an output shaft 28, particularly adapted to extend through the casing 18 and outwardly thereof.

Each of the converters 12 and 14 comprise driving wheels 30 that are disposed or positioned within the casing 16. The driving wheels 30 are non-rotatably mounted upon the input shafts 26 and 20 respectively, in any suitable manner, enabling the wheels to be rotatably translated or moved in the same direction as the input shafts. The driving wheels 30 may be of any suitable construction, and, preferably, comprise teeth (not shown) positioned about the periphery thereof, enabling an endless drive chain 32 to be positioned about the driving wheels, and extending therebetween. It will now be understood that an input of power to the input shaft 20 of the converter 14 will cause a rotatable translation or movement of both of the driving wheels 30 in the same direction. As pointed out above, the power input could be transmitted to the input shaft 26 of the converter 12, in which case the driving wheels 30 would still be rotatably translated in the same direction, through the medium of the drive chain 32.

As hereinbefore pointed out, the converters 12 and 14 are preferably of the variable type, and, for example, may be of the type described, disclosed, shown and illustrated in the aforesaid co-pending applications. Accordingly, a detailed description of the converters 12 and 14 is not deemed necessary herein, since reference can be had to the aforesaid applications for such a detailed description. It will, however, be understood that each of the converters 12 and 14 comprise an impeller or driving member that is particularly adapted to be operatively associated with the input shafts 26 and 20 respectively. Additionally, each of the converters comprise a turbine or driven member (not shown) that is particularly adapted to be operatively associated with the output shafts 28 and 22 respectively. As pointed out above, any power input to the converter 14 through the medium of the power input shaft 24, and the input shaft 20 thereof is transmitted to the converter 12 through the medium of the endless drive chain 32. Similiarly, any torque transmitted from the impeller or driving member (not shown) of the torque converter 12 to the turbine or driven member (not shown) thereof, and thence to the output shaft 28, is particularly adapted to be transmitted to the converter 14. To this end, a driven wheel 34 is non-rotatably positioned or mounted upon the output shafts 28 and 22 of the converters 12 and 14, respectively. The driven wheels are positioned or disposed within the casing or housing 18, and are so constructed and arranged as to present a plurality of teeth 36, completely about the periphery thereof. It is now considered readily apparent that the teeth 36 of each of the driven wheels, 34 are particularly adapted to be disposed in rotatable mutual cooperative engagement with one another.

The torque converters 12 and 14 are so constructed and arranged as to present a channel 38 (see FIGURE 4) defined in part by each of the impeller or driving member (not shown), and the turbine or driven member (also not shown) through which a fluid is particularly adapted to flow or be circulated, thus transmitting the torque therebetween. To vary the output of each converter without necessitating a variation in the power input, each of the converters comprise a control member 40 that is particularly adapted to be axially movable into and out of the channel 38, thus restricting the flow of fluid therethrough. Accordingly, it will be understood that, if the control member 40 is completely withdrawn or retracted from within the channel 38, the impeller (not shown) will transmit substantially all of the torque transmitted thereto to the turbine (not shown), with the exception of the minimal percentage of slippage inherently introduced by this type of power transmission device. And, if the control member is inserted completely into the channel, there will be no transmission of torque between those elements, there being substantially no circulation of fluid elements through the channel.

Each of the torque converters 12 and 14 further comprise a positioning arrangement 42 for selectively positioning the control member 40 relative to the channel 38. The positioning arrangements 42 may be of any suitable construction, such as that described, disclosed, shown and illustrated in United States Patent 3,221,896. Briefly, then, the positioning arrangements 42 comprise a fluid control mechanism 44, having a piston rod 46, a lever 48 and an operating rod 50 that extends, into the converters and is operatively associated with the control member 40 to cause or effect the aforesaid selectively axial movements thereof. The control mechanism 44 preferably comprises a biasing element, such as a spring, (not shown) disposed therewithin, for biasing the control mechanism, and, thus, the control member 48 to a position in which it fully restricts flow through the channel 38, in which position, therefore, there is no transmission of power between the impeller (not shown) and turbine (not shown) of the converters 12 and 14. Pneumatic or fluid pressure may be admitted to the fluid control mechanism 44, in any suitable manner, for overcoming the force of the aforesaid biasing element (not shown), to thus cause or effect a selected withdrawal or retracting movement of the control member 40 from within the channel 38, to thus effect a transmission of power, proportionate to the extent of movement of the control member, between the impeller (not shown) and the turbine (not shown).

For a more detailed description, reference may be had to the aforesaid application entitled "Variable Torque Converter and Control Means Therefor." Each of the positioning arrangements 42 are particularly adapted to be mounted on the casing 16. This may be accomplished in any suitable manner, as, for example, by means of suitable bracket assemblies 52.

It will now be understood that the present invention contemplates the provision of a plurality of variable torque converters, such as the converters 12 and 14, that are particularly adapted to be operatively associated with one another in such a manner as to define a multiple torque converter apparatus 10 of unitary construction. More particularly, the multiple torque converter apparatus of the present invention, is so constructed and arranged as to present an engine having a variable output from a source of constant power input. Still further, the multiple torque converter apparatus, or engine 10 of the present invention comprises a plurality of variable torque converters 12 and 14 operatively associated with one another in a unitary arrangement, enabling the engine to present a forward drive, a reverse drive, and variations in the output in each of these directions.

With particular reference now to FIGURE 4, the multiple torque converter apparatus or engine 10 is illustrated therein as providing zero output to a load or output shaft 54 that is operatively associated with the output shaft 22 of the converter 14, in any suitable manner. Before proceeding, it will be understood that the load shaft 54 is illustrated as being operatively associated with the converter 14 for exemplary purposes only, and that it can equally as well as similarly associated with the converter 12, as can be the power input shaft 24, as pointed out above. In this instance, the biasing elements (not shown) disposed within the control mechanisms 44 will bias control member 40 of each converter 12 and 14 to an inoperative position in which the control members are substantially completely inserted into the channels 38. Of course, no fluid pressure is being supplied to either one of the control mechanisms 44. If the constant power source or motor (not shown) is transmitting power, to the input shaft 20 of the converter 14, through the medium of the power input shaft 24, the impeller (not shown) of each converter will simply free-wheel, the impeller of the converter 12 free-wheeling through the medium of the endless drive chain 32.

With particular reference now to FIGURE 5, the engine 10 is illustrated therein as presenting an output at maximum rated load, the input from the power input shaft being transmitted directly through the converter 14 to the load shaft 54. In effect, therefore, the engine 10 is, in this instance, positioned for direct forward drive or speed. To this end, the positioning arrangement 42 mounted upon the converter 14 is supplied with fluid pressure to overcome the force of the biasing element disposed therewithin, to effect a complete withdrawal or retraction of the control member 40 of this converter within its channel 38. There being no restriction to the flow in the channel 38, therefore, the impeller (not shown) of this converter will transmit all of the power introduced thereto through the medium of the input shaft 24 to the turbine (also not shown), and thence to the output shaft 22, and the load shaft 54. As is considered readily apparent, the input shaft 24 and the load shaft 54 will be rotatably translated in the same direction. The power input from the shaft 24 will also be transmitted to the driving wheel 30 positioned upon the input shaft 20 of the converter 14. This driving wheel will transmit the power transmitted thereto to the driving wheel 30 of the converter 12 through the medium of the endless drive chain 32. As a result, the impeller (not shown) of the converter 12 will be rotatably translated in substantially the same direction as the impeller of the converter 14, this being true since the driving wheel 30 of each converter is positioned upon the input shafts thereof. However, since no fluid pressure is introduced into the positioning arrangement 42 of the converter 12, the biasing element (not shown) disposed therewithin maintains the control member 40 of this converter in the position illustrated in FIGURE 5, namely, in a position in which the control member is substantially completely inserted into the channel 38 thereof. Accordingly, no transmission of power will be effected between the impeller (not shown) and the turbine (not shown) of the converter 12, and, therefore, the turbine thereof will be allowed to free wheel. Since the driven wheels 34 of each of the converters 12 and 14 are disposed in intermeshing mutual cooperative engagement with one another through the medium of the teeth 36, the driven wheel 34 of the converter 12, and the output shaft 28 thereof, will be rotatably translated in a direction oppositely disposed with respect to the direction in which the output shaft 22 of the converter 14 is rotatably translated. However, since, as hereinbefore pointed out, the turbine (not shown) of the converter 12 is allowed to free wheel, little, if any, resistance will be encountered by the output shaft 22 of the converter 14 and, thus, the load shaft 54.

As hereinbefore pointed out, the engine 10, constructed in accordance with the principles of the present invention, is so constructed and arranged as to present a variable output from a constant input. With particular reference now to FIGURE 6, the converters 12 and 14 are illustrated therein as being positioned to enable the latter converter, namely, the converter 14, to present an output that is selectively less than the output presented when the converters are positioned as illustrated in FIGURE 5. Once again, the biasing element (not shown) disposed within the positioning arrangement 42 of the converter 12, biases the control member 40 to a position in which it is completely inserted into the channel 38. With no fluid being applied to this positioning arrangement, there will be no transmission of power between the impeller (not shown) and the turbine (also not shown) of the converter 12, enabling the turbine thereof to free-wheel. Fluid pressure is now introduced into the positioning arrangement 42 mounted upon the converter 14, to overcome the force of the biasing element (not shown) disposed therewithin. The amount of fluid pressure introduced is dependent upon the desired output at the load shaft 54, the required amount of fluid pressure causing or effecting a corresponding degree or extent of movement, namely, a withdrawal or retraction of the control member 40 from within the channel 38. As illustrated, and for exemplary purposes only, the control member 40 of the converter 14 is shown as having been withdrawn or retracted from within approximately one-half of the channel 38. Accordingly, the output at the load shaft 54 will be approximately one-half of the input at the shaft 24. It will be understood that the positioning arrangements 42 are so constructed and arranged as to provide or present a substantially infinite number of power steps between zero output, as illustrated in FIGURE 4, and maximum rated capacity as illustrated in FIGURE 5.

With particular reference now to FIGURE 7, the engine 10, constructed in accordance with the principles of the present invention is illustrated therein as presenting a reverse drive as opposed to a forward or direct drive, as illustrated in FIGURES 5 and 6. In this instance, the converter 14 is disposed in an inoperative position, namely, a position in which the control element 40 thereof is completely inserted into the channel 38, under the influence of the biasing element disposed within the positioning arrangement 42. Of course, no fluid pressure is applied to this positioning arrangement. Fluid pressure, however, is applied to the positioning arrangement 42 of the converter 12, to overcome the force of the biasing element (not shown) disposed therewithin. Accordingly, the control member 40 is completely withdrawn or retracted from within the channel 38. With no fluid pressure being supplied to the positioning arrangement 42 of the converter 14, both the impeller (not shown) and the turbine (not shown) thereof are allowed to free-wheel. Accordingly, power transmitted to the input shaft 20 of the converter from the power shaft 24 is transmitted from the free-wheeling impeller (not shown) to the driving wheel 30, thereof, and, thence through the medium of the endless drive chain 32, to the driving wheel 30 of the converter 12. Since the control member 40 of this converter is completely withdrawn from within the channel 38, the driving wheel 30 will transmit the power transmitted thereto to the impeller (not shown) thereof, thence to the turbine (not shown), and, finally, to the output shaft 28, and the driven wheel 34. Thus far, the power shaft 24, the input shaft 20, the driving wheels 30, the input shaft 26, the output shaft 28, and the driven wheel 34 of the converter 12, are all rotatably translated in the same general direction. As illustrated in FIGURE 7, particularly by the arrow at the shaft 24, this direction is generally clockwise, as viewed from the right of that figure. However, since the driven wheels 34 are disposed in an intermeshing mutual cooperative engagement with one another through the medium of the teeth 36, positioned about the periphery thereof, the driven wheel 34 positioned upon the output shaft 22 of the converter 14 will be caused to rotatably move in a counter-clockwise direction, when also viewed from the right of that figure. It is to be remembered that the impeller (not shown) and the turbine (also not shown) of the converter 14 are being allowed to free-wheel, and, therefore, little if any resistance is being encountered by the driven wheel 34 of the converter 12 in transmitting power to the driven wheel of the converter 14.

It will now be understood that an engine 10, constructed in accordance with the principles of the present invention, is so constructed and arranged as to present a forward or direct drive, as illustrated in FIGURES 5 and 6, and a reverse drive, as illustrated in FIGURE 7. In addition, the engine 10, is so constructed and arranged as to present, not only a direct or forward drive, and a reverse drive, but a variable output between zero output and maximum rated capacity in each of these directions. With reference once again to FIGURE 7, this is accomplished simply by varying the extent to which the control member 40 of the converter 12 has been withdrawn or retracted from within the channel 38 thereof.

The present invention contemplates the provision of an engine 10, comprising a plurality of variable torque converters 12 and 14 disposed in a unitary, superimposed or tandem relationship with respect to one another. The engine 10, as also hereinbefore pointed out, is so constructed and arranged as to present a direct or forward drive, a reverse drive, and variations in the output in each of those directions between zero output and maximum rated capacity. As is considered readily apparent, therefore, the engine 10 has many applications. One such application, which will now be described for exemplary purposes, is to operatively associate the engine with a hoist drum 70 of a crane assembly operating a cable 72 and having an input 74 as shown in FIGURE 9, such as would be found in a crane assembly, to provide a substantially infinite stepless speed control for power hoisting and power lowering of any load that comes within the maximum limits of the machinery. The motor connected to the power input shaft 24 may be a suitable reversible motor (not shown) as hereinbefore pointed out, or may simply be a uni-directional AC motor or diesel assembly. The output or load shaft 54 is, in turn, operatively associated with the hoist drum 70. In accordance with the foregoing description, it is considered readily apparent that the engine 10 will be effective to cause the hoist drum 70 to both raise and lower a suitable load. This will be accomplished both smoothly and positively, firstly, due to the very nature of a torque converter, which transmits power between the impeller and the turbine thereof, without necessitating the use of such mechanisms as gearing devices, and, in addition, to the fact that in both forward or direct drive, and in reverse drive, the engine 10 is capable of a substantially infinite stepless variation in the torque output thereof, from a constant input, between zero output and maximum rated output. The term "substantially infinite stepless variation" will be understood to mean a smooth, positive and yet gradual variation between these two limits of the engine, both in forward or direct drive, and in reverse drive.

The converter 12 of the engine 10, has been hereinbefore described as being disposed in an inoperative position when forward drive is desired, and power is transmitted from the power shaft 24 to the load shaft 54 through the converter 14, as illustrated in FIGURES 5 and 6. Similarly, the converter 14 has been described as being disposed in an inoperative position, as illustrated in FIGURE 7, when the engine is in reverse drive, and power is transmitted from the shaft 24 to the shaft 54 through the converter 12. When the engine 10 is applied to the hoisting or raising and lowering of a load through the medium of the hoist drum 70 of a crane assembly, it may be desired that an even more positive and control torque output be provided, particularly since the load will be handled by the flexible cable 72, the tension of which has a tendency to vary, and, more specifically, when the engine is in a reverse drive position, thus providing a power lowering of the load. With particular reference now to FIGURE 8, the converter 14 of the engine 10 is illustrated therein as being positioned for forward or direct drive, with the control member 40 thereof being fully withdrawn or retracted from within the channel 38 enabling power to be transmitted through the converter from the shaft 24 to the shaft 54. The engine 10 is thus positioned to perform a hoisting or raising function of a load. To provide maximum positive control over the converter 14, as it performs this function, the converter 12 is positioned to provide the resistance thereof. Thus, the control member 40 thereof, as opposed to being disposed in a position in which it is full inserted into the channel 38, is withdrawn or retracted partially therefrom. Accordingly, the driven wheel 34 mounted upon the output shaft 28 of the converter 12, will tend to rotate in a clockwise direction as viewed from the right of FIGURE 8. However, the driven wheel 34 positioned upon the output shaft 22 of the converter 14, is rotating in the same direction when performing the aforesaid hoisting or raising function. Since the driven wheels 34 are disposed in an intermeshing mutual cooperative engagement with one another through the medium of the teeth 36, they must rotate in oppositely disposed directions. Accordingly, since, in the position illustrated in FIGURE 8, the converter 14 is providing maximum rated torque output, the control member 40 thereof being completely withdrawn or retracted from within the channel 38, the driven wheel 34 of the converter will cause the driven wheel of the converter 12 to rotatably move in an oppositely disposed direction. It will be understood, therefore, that the tendency of the driven wheel of the converter 12 to rotate in the same direction as the driven wheel of the converter 14 will provide or present a resistance to the performance of the function by the converter 14. There will thus be provided a very positive control over the hoisting or raising of a load by the hoist drum 70 of a crane assembly. The positioning arrangements 42 can be provided with a suitable hydraulic or pneumatic control circuit 76, enabling accurate regulation over the degree of resistance to be provided and, the timing sequence at which the resistance is to be introduced. While the aforesaid description applied to presenting a more positive control when the engine 10 is in direct or forward drive, it will, of course, be understood that the same result can be achieved when the engine is in reverse drive, in which it performs a lowering function. In this instance, the control member 40 of the converter 12 will be withdrawn or retracted from within the channel 38 corresponding to the degree of output required, and the control member 40 of the converter 14 withdrawn to a proportionately lesser extent, enabling the presentation of the proper resistance to the lowering function being performed by the engine. It is in this instance that this feature of an engine, such as the engine 10, constructed in accordance with the principles of the present invention, becomes particularly significant. This is particularly true when it is realized that loads of substantial magnitude have a tendency to overcome or overpower the rated capacity of the engine. When the load to be handled is of small magnitudes, the degree of resistance required is decreased, and the engine 10 can perform the function of power lowering the load to the desired location.

With continued reference to the engine 10 as being applied to the hoist drum 70 of a crane assembly, and the raising and lowering of a load to be handled by the crane assembly, consider now, with reference to FIGURE 9, wherein like parts are indicated by like reference characters, but wherein the reference characters are primed, the instance in which the engine 10' is to be rendered operative, or turned "on" and a load of substantial magnitude is to be handled. When the engine is in an inoperative position, or has been turned "off," the converters 12' and 14' are in a similar inoperative position. In this position, the control members 40' of the converters are fully inserted into the hannels 38'. Accordingly, upon rendering the engine 10' operative, a load of substantial magnitude will, in the absence of any provision to the contrary, cause the turbine of the converter 14' to free-wheel when a load shaft, such as the shaft 54' is operatively associated with that converter. To preclude a load from, in effect, "running away from the engine 10'," the egine comprises a positioner 56, mounted upon the casing or housing 18' adjacent the converter 12'. The positioner 56 comprises a piston rod 58 that is particularly adapted to be operatively associated with or connected to the lever 48' of the positioner 42' of the converter 14', the position 42' being mounted upon the casing 16' substantially adjacent thereto. The positioner 56 is, in all other respects, of substantially the same construction as that of the positioners 42'.

The positioner 56 is particularly adapted to perform the function decreasing or dissipating the torque transmitted to the load shaft 54' by the converter 14'. That is, immediately upon turning the engine 10' "on," the converter 14' through the medium of the positioner 42' thereof, mounted upon the casing 16' adjacent thereto, is to be rendered fully operative, with the control member (not shown) thereof, completely withdrawn or retracted from within the channel (not shown). Accordingly, the load to be lowered to a desired location will not be able to descend since the converter 14' is operating in direct or forward drive, that is, in a hoist direction as hereinbefore pointed out. When it is desired to lower the load, fluid pressure is applied to the positioner 42' of the converter 12', mounted upon the casing 16' adjacent thereto, to render that converter operative by withdrawing the control member (not shown) thereof from within the channel (also not shown). If the converter 14' is positioned at maximum rated capacity to present a force in a hoist direction in order to preclude the load from "running away from the engine," no lowering of the load can take place. In fact, no lowering can take place until the torque transmitted through the converter 14' is less than that transmitted through the converer 12'. The positioner 56 is particularly adapted to decrease the resistance presented by the converter 14', and, specifically, is cooperable with the positioner 42' that controls the converter 12', enabling the extent of decrease in resistance by the converter 14' to correspond generally with the extent of increase in the torque transmited through the converter 12' in a reverse drive or lowering direction. Thus, as pressure to the positioner 42' controlling the converter 12' is increased, pressure to the positioner 56 is similarly increased. A force will thus be transmitted to the positioner 42' of the converter 14' through the medium of the rod 58, lever 48' and operating rod 46'. This force will cooperate with the biasing element (not shown) of the positioner 42' to gradually overcome the force of the fluid pressure applied thereto, thus returning the positioner to its inoperative position. It will be understood that the length of time, required to return the positioner 42' of the converter 14' to this position can be varied, depending upon how long a retarding or resisting force is to be presented. The time factor also depends upon the desired speed of lowering the load, the magnitude of the load, and other factors. It can be said that the hoisting or upward force introduced or presented by the converter 14' is preferably dissipated relatively quickly, since, as soon as the pressure of fluid in the system to the positioner 42' of the converter 12' reaches an operating level, this converter will provide sufficient control to preclude a load from "running away from the engine." This is particularly true since the converters 12' and 14', as is the case with the converters 12 and 14, present a substantially infinite stepless output from a constant power input.

The fluid pressure supplied to the positioner 56 can be made to correspond to that supplied to the positioner 42' of the converter 12' in any suitable manner. For example, a simple fluid circuit 76 can substantially simultaneously supply fluid pressure to each positioner of generally the same magnitude. If, however, a rather rapid decrease in the resistance presented by the converter 14' is desired, then the aforesaid circuit should comprise a control valve (not shown) that admits a higher fluid pressure to the positioner 56, with pressure supplied to the positioner 42' of the converter 12' being modulated, in any suitable manner, to some desired and suitably lesser magnitude. Another exemplary arrangement is to provide a circuit in which fluid pressure is independently supplied to each positioner, the control of each independent portion of the circuit being effected in any suitable manner, as by means of manually operable control valves (not shown). Each such control valve could be provided with a position and pressure indicator, so that the proper relationship between pressures supplied to the positioners can be effected by an operator with facility.

As pointed out above, the present invention contemplates the provision of an engine comprising a plurality of variable torque converters disposed in a unitary, superimposed or tandem operative association with one another. The engine is so constructed and arranged as to present a direct or forward drive, and a reverse drive. In addition, the engine, and the variable torque converters comprising the engine, are so constructed and arranged as to provide a substantially infinite stepless variation in each direction of the engine, from zero output to maximum rated capacity. Still further, the engine is so constructed and arranged as to enable one of the torque converters thereof to present a resistance to the function being performed by another one of the converters. Accordingly, both in direct or forward drive, and in reverse drive, the engine, in addition to providing a substantially infinite stepless variation in the output thereof, from a constant input, is capable of presenting a smooth, positive and controlled power delivery at the output end thereof. An engine, such as the engine 10, constructed in accordance with the principles of the present invention, is capable of many applications as a unitary engine. One such application is the operative association of an engine of the present invention with the hoist drum 70 of a crane assembly. When so applied, the engine 10 is capable of performing a hoisting and a lowering function, enabling the power raising and the power lowering of loads of varying magnitude, that is, loads that are relatively small, as well as loads that correspond generally with the maximum rated capacity of the crane assembly. It is desirable, in this instance, as hereinbefore pointed out, that the engine be so constructed and arranged as to be rendered operative in a forward or direct drive speed to perform a hoisting function, as soon as the engine is turned "on," thus presenting an upward force that will preclude a load, and particularly a load of substantial magnitude, from "running away from the engine." This upward force, retarding or restraining force, is to be dissipated when the engine is ready to power lower a load to a desired location at selected speeds. The engine, still further, is so constructed and arranged as to gradually decrease this upward force at a rate that is related to the rate of increase of the engine speed to the desired power lowering value.

For exemplary purposes, therefore, it can be said that an engine constructed in accordance with the principles of the present invention, such as the engine 10, comprises a plurality of variable torque converters, such as the converters 12 and 14, disposed in a unitary, superimposed or tandem association with one another. The terminology "unitary, superimposed or tandem operative association" is intended to mean little more than that the converters are located adjacent or next to one another, so that, in fact, they can be operatively associated to transmit the power from a constant input to either one or both to a variable output. An engine comprising such a plurality of variable torque converters, is thus capable of presenting a direct or forward drive, and a reverse drive. In each direction, the engine's output is variable substantially infinitely from zero output to maximum rated capacity. Each converter comprises a positioning arrangement, such as the positioning arrangements 42, enabling the presentation of this substantially infinite output, and in particular, enabling the output of each converter to be smoothly and positively selected. Furthermore, an engine comprising such a plurality of converters, namely, the two converters described, disclosed, shown and illustrated hereinbefore, is further capable of presenting controlled resistance to each output direction, thus further increasing the ability of the engine to provide a smooth, and controlled variable output. In those instances in which the engine is particularly adapted to be operatively associated with, for example, the hoist drum of a crane assembly, in which instance the crane assembly is particularly adapted to handle loads of variable magnitude, and, more particularly, loads of substantial magnitude which have a tendency to "run away from the engine," an engine constructed in accordance with the principles of the present invention, such as the engine 10', comprises, in addition to a plurality of variable torque converters, such as the torque converters 12' and 14', each of which comprises a positioning arrangement, such as the positioning arrangements 42', another positioning arrangement such as the arrangement 56, for dissipating the retarding, restraining or upward force introduced by that one of the converters 12' and 14' particularly adapted to function in a forward or direct drive direction, that is, a hoist direction.

The engines 10 and 10' constructed in accordance with the present invention, are capable of numerous modifications. For example, suitable clutching devices can be introduced to eliminate any "drag" and, in addition, to introduce further versatility into the system. For example, a clutching device can be introduced between the power input shaft 24 or 24' of the engines 10 or 10', respectively, and the input shafts 20 and 20', respectively, thereof. A further clutching device can be introduced into that portion of the system comprising the converter 12 or 12' or the engine 10 or 10', respectively, enabling an engaging and a disengaging of the driven wheels 34. In this manner, when the motor (not shown) that is operatively associated with the power input shaft 24 or 24', is of the reversible type, then it is conceivable that the converter 14 or 14' will itself be capable of providing an output in a forward or direct drive or speed and a reverse drive or speed as well. Furthermore, a suitable gearing assembly can be introduced between the driven wheels 34, if that is found necessary with respect to that feature of the present invention enabling one of the converters thereof to present a retarding or resisting force to the direction of operation of another one of the converters. The present invention, still further, contemplates the provision of more than two variable torque converters operatively associated with one another if that is found desirable, and, therefore, the term "plurality of torque converter apparatus" is to be given its broadest possible interpretation and construction.

Any relative terminology used in the foregoing description of the present invention to define direction has been used to facilitate an understanding thereof. Accordingly, it will be understood that this terminology is intended, both in the foregoing description, and if and when used in the ensuing claims, in its normal and accepted sense, is not intended in any way to be limited, and, therefore, is to be given its broadest possible interpretation and construction.

While the invention has been shown, illustrated, described and disclosed in terms of embodiments or modifications which it has assumed in practice, the scope of the invention should not be deemed limited by the precise embodiments or modifications herein shown, illustrated, described or disclosed, such other embodiments or modifications intended to be reserved especially as they fall within the scope of the claims here appended.

What is claimed is:
1. An engine comprising, in combination:
a plurality of casings;
a plurality of variable output torque converters mounted between said casings, and being disposed in tandem operative association with one another;
each of said variable output torque converters comprising:
an input shaft extending through one of said casings;
a driving wheel mounted upon said input shaft for rotation therewith, and being positioned within said one casing;
an output shaft extending through another of said casings;
a driven wheel mounted upon said output shaft for rotation therewith, and being positioned within said other casing;
said driven wheels having:
teeth extending about the periphery thereof;
the teeth disposed about one driven wheel being positioned in engagement with the teeth disposed about the other wheel, enabling the driven wheels to be rotatably moved in oppositely disposed directions when a rotatable force is applied to at least one of said output shafts;
a channel within which a fluid is particularly adapted to circulate to enable each converter to transmit a rotative force from the input shaft to the output shaft thereof;
a control member axially movable relative to said channel for varying the circulation of fluid therethrough, and enabling the transmission of a force between the input shaft and the output shaft to be smoothly, positively and gradually varied;
a positioning arrangement operatively associated with said control member for smoothly, positively and gradually axially moving said member with respect to said channel, said positioning arrangement comprising;
a fluid control mechanism;
a piston rod; and
a lever;
an operating rod extending between said lever and the control member;
said fluid control mechanism normally being disposed in a position in which the control member is fully inserted into said channel to substantially completely restrict the circulation of a fluid therethrough, and to preclude the transmission of a rotative force between the input and output shafts;
said fluid control mechanism, when fluid is applied thereto, reciprocally moving said piston rod, and to smoothly, positively and gradually axially move the control member relative to said channel;
and endless drive chain positioned about and extending between said driving wheels, enabling said input shafts to be rotatably moved in the same direction;
a power input shaft connected to at least one of the input shafts of said converters; and
a load shaft connected to at least one of the output shafts of said converters.

2. A multiple variable torque converter arrangement comprising:
a first variable torque converter having input structure, generally aligned output structure and control structure for varying the torque output relative to the torque input, the control structure of the first torque converter comprising
a first positioner having a positioner rod operatively connected to the first torque converter for varying the torque output thereof from a low value to a high value; and
means for selectively actuating the first positioner for moving the positioner rod to a high torque position;

a second variable torque converter having input structure, generally aligned output structure, and control structure for varying the torque output relative to the torque input, the axes of the input and output structure being radially spaced from the axes of the input and output structure of the first converter, the control structure of the second torque converter comprising a second positioner operatively connected to the second torque converter for varying the torque output thereof from a low value to a high value;

a third positioner operatively connected to the positioner rod and arranged to oppose movement thereof;

means for contemporaneously actuating the second and third positioners;

structure connecting the input structure of the first converter structure connecting the input shaft of the first converter and the input structure of the second converter for driving the respective inputs of the first and second converters in the same rotary direction;

structure connecting the output structure of the second converter and the output structure of the first converter for driving the respective outputs of the first and second converters in opposite rotary directions to enable the arrangement to effect reverse rotary roation of the output structure of the first converter by manipulation of the respective control structure; and an output shaft affixed to only the output structure of the first torque converter.

3. A hoist drive comprising:

a hoist drum for raising and lowering a load, the hoist drum having input structure;

a multiple variable torque converter arrangement comprising:

a first variable torque converter having input structure, generally aligned output structure, and control structure for varying the torque output relative to the torque input, the control structure of the first converter comprising a first fluid positioner having a positioner rod operatively connected to the first torque converter for varying the torque output thereof from a low value to a high value; and circuit means for selectively delivering pressurized fluid to the first positioner for moving the positioner rod to a high torque position;

a second variable torque converter having input structure; generally aligned output structure, and control structure for varying the torque output relative to the torque input, the axes of the input and output structures being radially spaced from the axes of the input and output structure of the first converter; the control structure of the second converter comprising a second fluid positioner operatively connected to the second torque converter for varying the torque output thereof from a low value to a high value;

a third fluid positioner operatively connected to the positioner rod and arranged to oppose movement thereof;

circuit means for contemporaneously delivering pressurized fluid to the second and third positioner;

structure connecting the input structure of the first converter and the input structure of the second converter for driving the respective inputs of the first and second converters in the same rotary direction;

structure connecting the output structure of the second converter and the output structure of the first converter for driving the respective outputs of the first and second converters in opposite rotary directions to enable the arrangement to effect reverse rotary rotation of the output structure of the first converter by manipulation of the respective control structure and an output shaft affixed to only the output structure of the first torque converter.

References Cited

UNITED STATES PATENTS

| 2,141,940 | 12/1938 | Sinclair | 74—730 |
|---|---|---|---|
| 2,307,284 | 1/1943 | Magee | 74—361 |
| 2,423,820 | 7/1947 | Baumann | 74—718 |
| 2,568,275 | 9/1951 | Dahlstrand et al. | 74—361 |
| 3,176,544 | 4/1965 | Baumeister | 74—730 |
| 3,254,544 | 6/1966 | Maurice et al. | 74—732 |

FOREIGN PATENTS

| 747,341 | 4/1956 | Great Britain. |
|---|---|---|
| 442,757 | 11/1948 | Italy. |

DONLEY J. STOCKING, *Primary Examiner.*

THOMAS C. PERRY, *Examiner.*